United States Patent
Haendle et al.

(10) Patent No.: US 11,577,481 B2
(45) Date of Patent: Feb. 14, 2023

(54) APPARATUS AND METHOD FOR CYLINDER CHANGEOVER WITH A MECHANICALLY LOCKABLE FORCE-BUILDING CYLINDER

(71) Applicant: MOOG GmbH, Boeblingen (DE)

(72) Inventors: Werner Haendle, Marbach a.N. (DE); Achim Helbig, Stuttgart (DE); Christoph Boes, Reutlingen (DE); Michael Sieber, Magstadt (DE)

(73) Assignee: Moog GmbH, Boeblingen (DE)

( * ) Notice: Subject to any disclaimer, the term of this patent is extended or adjusted under 35 U.S.C. 154(b) by 0 days.

(21) Appl. No.: 16/768,661

(22) PCT Filed: Dec. 3, 2018

(86) PCT No.: PCT/EP2018/083384
§ 371 (c)(1),
(2) Date: May 30, 2020

(87) PCT Pub. No.: WO2019/110530
PCT Pub. Date: Jun. 13, 2019

(65) Prior Publication Data
US 2021/0170709 A1 Jun. 10, 2021

(30) Foreign Application Priority Data
Dec. 7, 2017 (DE) .......................... 102017129117.2

(51) Int. Cl.
*B30B 15/16* (2006.01)
*B29C 45/67* (2006.01)
(Continued)

(52) U.S. Cl.
CPC ............ *B30B 15/161* (2013.01); *B30B 1/323* (2013.01); *B29C 45/67* (2013.01); *F15B 21/14* (2013.01);
(Continued)

(58) Field of Classification Search
CPC ........ B29C 45/67; F30B 1/323; F30B 15/161; F15B 2211/20515; F15B 2211/27
See application file for complete search history.

(56) References Cited

U.S. PATENT DOCUMENTS

| | | | |
|---|---|---|---|
| 2,689,978 A | * | 9/1954 | Roger ................. B29C 45/6714 425/451.2 |
| 3,603,248 A | | 7/1971 | Nouel |

(Continued)

FOREIGN PATENT DOCUMENTS

| | | | | |
|---|---|---|---|---|
| DE | 2112701 A1 | * | 9/1972 | ......... B29C 45/6714 |
| DE | 19608486 C1 | * | 7/1997 | ............. B30B 1/323 |

(Continued)

OTHER PUBLICATIONS

European Patent Office (ISA/EP), International Search Report and Written Opinion of the ISA in International Patent Application No. PCT/EP2018/083384, dated Jun. 13, 2019.

*Primary Examiner* — Kenneth Bomberg
*Assistant Examiner* — Matthew Wiblin
(74) *Attorney, Agent, or Firm* — Harter Secrest & Emery LLP

(57) ABSTRACT

An electro-hydrostatic drive for realizing a rapid movement and a force-building movement, comprising a hydro-machine with variable volume and/or rotational speed, driven by an electric motor, for providing a volume-flow of a hydraulic fluid, a first cylinder with a housing, a piston, a cylinder rod, and a first and a second cylinder chamber, a second cylinder with a piston, a cylinder rod, and a first and a second cylinder chamber, a moveable carrier plate, a pillar, and a clamping apparatus to clamp and/or unclamp the first cylinder to the pillar, where the hydraulic drive has a closed hydraulic circuit, which has, when run, a positive pressure above atmospheric pressure and which, by utilizing the hydro-machine, can pressurize either the first or the second cylinder chamber of the first cylinder and/or the first or the second cylinder chamber of the second cylinder. The moveable carrier plate is connected both to the first cylinder and to the second cylinder. For the force-building movement, the first cylinder is clamped, by the clamping apparatus, to the pillar and one cylinder chamber of the first cylinder is pressurized with the hydraulic fluid, and for the rapid
(Continued)

Figure 1:
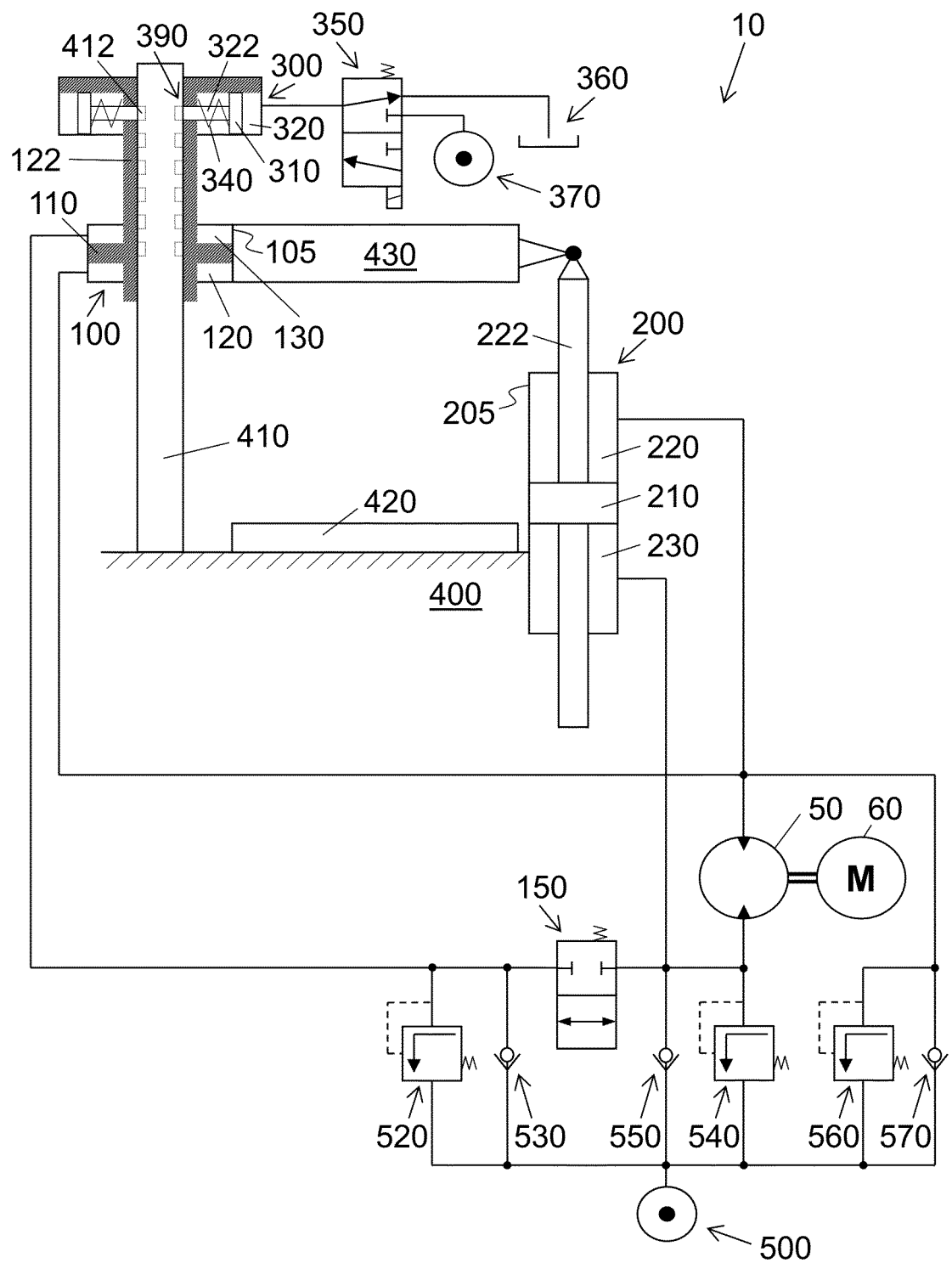

movement, the first cylinder is unclamped, by the clamping apparatus, from the pillar and one cylinder chamber of the second cylinder is pressurized with the hydraulic fluid.

23 Claims, 5 Drawing Sheets

(51) Int. Cl.
  *B30B 1/32* (2006.01)
  *F15B 21/14* (2006.01)
(52) U.S. Cl.
  CPC . *F15B 2211/20515* (2013.01); *F15B 2211/27* (2013.01)

(56) References Cited

U.S. PATENT DOCUMENTS

| | | | |
|---|---|---|---|
| 4,235,088 A | 11/1980 | Kreiskorte | |
| 5,091,124 A * | 2/1992 | Zakich | B29C 33/202 264/328.6 |
| 6,164,947 A * | 12/2000 | Miyahara | B29C 45/84 425/136 |
| 6,334,768 B1 * | 1/2002 | Looije | B29C 49/56 425/541 |
| 7,704,068 B2 | 4/2010 | Dantlgraber | |
| 9,452,559 B2 * | 9/2016 | Zeidlhofer | B29C 45/84 |
| 2005/0226958 A1 * | 10/2005 | Tsuji | B29C 45/7653 425/595 |
| 2007/0251400 A1 * | 11/2007 | Glass | F15B 11/0426 100/269.01 |
| 2012/0272708 A1 | 11/2012 | Scheidl et al. | |
| 2017/0210047 A1 | 7/2017 | Otto et al. | |

FOREIGN PATENT DOCUMENTS

| | | | | |
|---|---|---|---|---|
| DE | 19822436 A1 | 10/1999 | | |
| DE | 19955519 A1 * | 5/2001 | ........... | B21D 26/039 |
| DE | 10023879 A1 | 3/2002 | | |
| DE | 102010036204 A1 | 3/2012 | | |
| DE | 102011116964 A1 | 5/2012 | | |
| EP | 1284179 A1 | 2/2003 | | |

* cited by examiner

APPARATUS AND METHOD FOR CYLINDER CHANGEOVER WITH A MECHANICALLY LOCKABLE FORCE-BUILDING CYLINDER

The present invention relates to hydraulic units, used e.g. in machines for injection moulding, die casting, blow moulding machines, and to presses, particularly to hydraulic presses that have both a force-building movement and a rapid movement.

Hydraulic presses are known in the art. Such presses usually have, e.g. two, coupled cylinders, which are used for the rapid movement and the force-building movement. The coupling is achieved, for instance, via a moveable carrier plate that is connected to all cylinders. Hence, all the cylinders used by the press are moved over the same distance. Some hydraulic presses use cylinders with considerably different diameters. In these cases, the bigger cylinders are used for the force-building movement and the smaller ones for the rapid movement.

Since all cylinders move over the same distance, even for the rapid movement a huge amount of hydraulic fluid needs to be moved through the system. This causes, among other effects, unnecessarily high power consumption for the rapid movement and high loads on the valves.

Therefore, it is task of the present invention to overcome the disadvantages of the state of the art, at least partly.

This task is solved by the apparatus according to claim 1 and method according to claim 22. Preferred embodiments are subject of dependent claims.

An apparatus according to the present invention is an electro-hydrostatic drive for realizing a rapid movement and a force-building movement, which comprises a hydro-machine with variable volume and/or rotational speed, driven by an electric motor, for providing a volume-flow of a hydraulic fluid, a first cylinder with a housing, a piston, a cylinder rod, and a first and a second cylinder chamber, a second cylinder with a piston, a cylinder rod, and a first and a second cylinder chamber. Additionally, it has a moveable carrier plate, and a pillar. Furthermore, a clamping apparatus is included, to clamp and/or unclamp the first cylinder to or from the pillar, respectively. The hydraulic drive has a closed hydraulic circuit, which has, when run, a positive pressure above atmospheric pressure and which, by means of the hydro-machine, can pressurize either the first or the second cylinder chamber of the first cylinder and/or the first or the second cylinder chamber of the second cylinder.

The invention is characterized in that the moveable carrier plate is connected both to the first cylinder and to the second cylinder. For the force-building movement, the first cylinder is clamped, by the clamping apparatus, to the pillar and one cylinder chamber of the first cylinder is pressurized with the hydraulic fluid. For the rapid movement, the first cylinder is unclamped, by the clamping apparatus, from the pillar and one cylinder chamber of the second cylinder is pressurized with the hydraulic fluid.

A hydro-machine according to this invention has variable volume and/or rotational speed and is driven by an electric motor. Either the electric motor may have variable rotational speed, or the pump may be of adjustable volume, or both elements may be variable.

The invention comprises a first and a second cylinder. In the following, the first cylinder is assumed to be bigger, particularly significantly bigger, than the second cylinder, particularly its piston area is bigger than the piston area of the second cylinder.

An electro-hydrostatic drive according to this invention comprises a moveable carrier plate. The moveable carrier plate has a fixed carrier plate as a counterpart. When used as a press, the moveable and/or the fixed carrier plate carries a tool, e.g. a stamp. In the following, the terms "downward", "upward", "upper chamber" and "lower chamber" are used in a way that assumes the moveable carrier plate is arranged above the fixed carrier plate. Consequently, "downward" is interpreted as a movement of the moveable towards the fixed carrier plate, and "upward" means a movement of the moveable away from the flied carrier plate. This is also the manner how the system is depicted in the drawings. Similar applies to the cylinders' chambers: "upper chamber" and "lower chamber" are to be interpreted as shown in the drawings. For an electro-hydrostatic drive, where the moveable and the fixed carrier plate are arranged differently than shown in the drawings, e.g. the moveable carrier plate is arranged below or on a side of the fixed carrier plate, these definitions are to be applied accordingly: Then, e.g., "downward" still means a movement of the moveable carrier plate towards the fixed carrier plate.

The "pillar" may comprise more than one pillar, e.g. to move the moveable carrier plate more evenly. At least one of the pillars needs to be clampable.

An apparatus according to the present invention comprises a first cylinder, which is mainly used for the force-building movement, and a second cylinder, which is mainly used for the rapid movement. In addition, it has a pillar and a clamping apparatus to improve the overall efficiency of the system.

In the force-building movement (phase), the first cylinder is clamped to the pillar—and thus shored up by the pillar—, by using the clamping apparatus. After having clamped the first cylinder to the pillar, one cylinder chamber of the first cylinder is pressurized with the hydraulic fluid. It depends on the embodiment, which one of the cylinder chambers of the first cylinder is pressurized. The first cylinder is usually bigger than other cylinder or cylinders, because a high amount of force is needed for the force-building movement. Usually, the moveable parts of the hydraulic press are only moved for a relatively short distance in the force-building phase. In some embodiments, the first cylinder is pressurized exclusively during the force-building movement. The pressurized hydraulic fluid is provided by the hydro-machine with variable volume and/or rotational speed, which is driven by an electric motor. Additionally, further pressure sources may be available in the system.

In the rapid movement (phase), the first cylinder is unclamped, by the clamping apparatus, from the pillar and one cylinder chamber of the second cylinder is pressurized with the hydraulic fluid. This leads to a significant improvement of the energy efficiency of the system, because the large amount of hydraulic fluid in the first cylinder, which is needed to implement the force-building movement, is not (unnecessarily) moved during the rapid movement, because the first cylinder is unclamped and thus no force is affecting the first cylinder during rapid movement.

In one embodiment, the moveable carrier plate is connected to the housing of the first cylinder and to the cylinder rod of the second cylinder.

In this embodiment, the cylinder rod of the first cylinder is connected to the piston of the first cylinder and arranged around the pillar. The cylinder rod may be clamped or unclamped to the pillar. When clamped to the pillar, a force-building movement can be achieved by pressurizing one cylinder chamber of the first cylinder with the hydraulic fluid. Since the moveable carrier plate is connected to the housing of the first cylinder, said carrier plate is moved with big force, then. This movement of the carrier plate includes a movement of the cylinder rod of the second cylinder, because the moveable carrier plate is also connected to the cylinder rod of the second cylinder. When unclamped to the pillar, the rapid movement can be performed. Then, the cylinder rod of the first cylinder is moveable up and down the pillar with relatively low friction. For the rapid movement, one cylinder chamber of the second cylinder is pressurized, and the moveable carrier plate and the first cylinder, which is connected via its housing to the carrier plate, are moved. Since there is no connection to the pillar, (almost) no movement of the hydraulic fluid in the first cylinder takes place. Therefore, waste of energy is avoided, which would be caused by the movement of the hydraulic fluid in the first cylinder. This arrangement reduces the energy consumption of the system during the rapid movement phase considerably.

In one embodiment, the moveable carrier plate is connected to the housing of the first cylinder and to the housing of the second cylinder.

In this embodiment, the cylinder rod of the first cylinder is also connected to the piston of the first cylinder and arranged around the pillar. Again, the cylinder rod may be clamped or unclamped to the pillar. When clamped to the pillar, a force-building movement is performed by pressurizing one cylinder chamber of the first cylinder with the hydraulic fluid. This moves the first cylinder, and also the moveable carrier plate and the housing of the second cylinder, which are connected. For the rapid movement, the cylinder rod of the first cylinder is unclamped from the pillar. Then, a movement of the second cylinder causes a movement of the carrier plate and of the first cylinder, with (nearly) no moving of the hydraulic fluid in the first cylinder.

In one embodiment, the moveable carrier plate is connected to the cylinder rod of the first cylinder and to the cylinder rod of the second cylinder.

In this embodiment, the cylinder rod of the first cylinder is arranged around the pillar, again, and is moveable up and down the pillar, with relatively low friction. Said cylinder rod is also connected to the moveable carrier plate, but not connected to the clamping apparatus. In fact, the housing of the first cylinder is connected to a clamping apparatus; said clamping apparatus can be clamped or unclamped to the pillar. For the force-building movement, the clamping apparatus is clamped to the pillar. Then, when pressurizing one cylinder chamber of the first cylinder, the first cylinder is stuck, because by the clamping apparatus is connected to its housing, and thus the cylinder rod of the first cylinder is moved. Said cylinder rod of the first cylinder also moves the moveable carrier plate and the cylinder rod of the second cylinder, because it is connected to them. For the rapid movement, the clamping apparatus is unclamped from the pillar and one chamber of the second cylinder is pressurized with the hydraulic fluid. Again, the first cylinder is moved with low friction, and thus (nearly) no moving of the hydraulic fluid in the first cylinder takes place.

In one embodiment, the moveable carrier plate is connected to the cylinder rod of the first cylinder and to the housing of the second cylinder.

Again, the cylinder rod of the first cylinder is arranged around the pillar and is moveable up and down the pillar with relatively low friction. For the force-building movement, the clamping apparatus, which is connected to the housing of the first cylinder, is clamped to the pillar. On pressurizing one cylinder chamber of the first cylinder, the first cylinder is stuck—by its housing—and thus both the carrier plate and the housing of the second cylinder are moved. For the rapid movement, the clamping apparatus is unclamped from the pillar and one chamber of the second cylinder is pressurized with the hydraulic fluid. Then, the carrier plate, which is connected to the second cylinder's housing, and the first cylinder, via its cylinder rod, are moved. Due to the unclamping, the first cylinder is moved with (very) low friction, and (nearly) no moving of the hydraulic fluid in the first cylinder takes place.

For the force-building movement downward, the first cylinder chamber of the first cylinder is pressurized with the hydraulic fluid.

For some embodiments, where the moveable carrier plate is connected to the cylinder rod of the first cylinder and the clamping apparatus is connected to the housing of the first cylinder, the first cylinder chamber is the upper one. When pressurizing this chamber, the first cylinder's cylinder rod—and thus the moveable carrier plate, which is connected to said cylinder rod—moves downward.

For other embodiments, where the moveable carrier plate is connected to the housing of the first cylinder and the cylinder rod may be clamped or unclamped to the pillar, the first cylinder chamber is the lower one. When pressurizing this chamber, the first cylinder's housing—and thus the moveable carrier plate, which is connected to said housing—moves downward.

In several embodiments, for the force-building movement downward, along with the first cylinder chamber of the first cylinder, a selected cylinder chamber of the second cylinder, which acts into the same direction, is pressurized with the hydraulic fluid. The force-building movement upward is handled analogously in these embodiments.

The advantage of these embodiments is, that the first cylinder and the second cylinder cooperate for the force-building movement. Thus, the acting force is increased, because the chamber areas—and thus the forces—of the first cylinder and the second cylinder are added. In addition, for some arrangements of the cylinders and the pillar, the system gains stability by applying force simultaneously on the area of the moveable carrier plate. These may make the moveable carrier plate to move more evenly.

For embodiments, where the moveable carrier plate is connected to the cylinder rod of the second cylinder, the selected cylinder chamber of the second cylinder is the upper one for moving the moveable carrier plate downward. For other embodiments, where the moveable carrier plate is connected to the housing of the second cylinder, the selected cylinder chamber of the second cylinder is the lower one for moving the moveable carrier plate downward.

For the force-building movement upward, the second cylinder chamber of the first cylinder is pressurized with the hydraulic fluid, along with a selected cylinder chamber of the second cylinder, which acts into the same direction.

For some embodiments, where the moveable carrier plate is connected to the cylinder rod of the first cylinder and the clamping apparatus is connected to the housing of the first cylinder, the first cylinder chamber is the lower one. When pressurizing this chamber, the first cylinder's cylinder rod—and thus the moveable carrier plate, which is connected to said cylinder rod—moves upward.

For other embodiments, where the moveable carrier plate is connected to the housing of the first cylinder and the cylinder rod may be clamped or unclamped to the pillar, the first cylinder chamber is the upper one. When pressurizing this chamber, the first cylinder's housing—and thus the move-able carrier plate, which is connected to said housing—moves upward.

In some embodiments, for the force-building movement upward, along with the second cylinder chamber of the first cylinder a selected cylinder chamber of the second cylinder, which acts into the same direction, is pressurized with the hydraulic fluid.

For embodiments, where the moveable carrier plate is connected to the cylinder rod of the second cylinder, the selected cylinder chamber of the second cylinder is the lower one. For other embodiments, where the moveable carrier plate is connected to the housing of the second cylinder, the selected cylinder chamber of the second cylinder is the upper one.

For the rapid movement downward, the first cylinder chamber of the second cylinder is pressurized with the hydraulic fluid.

For embodiments, where the moveable carrier plate is connected to the cylinder rod of the second cylinder, the first cylinder chamber of the second cylinder is the upper one. For other embodiments, where the moveable carrier plate is connected to the housing of the second cylinder, the first cylinder chamber of the second cylinder is the lower one.

For the rapid movement upward, the second cylinder chamber of the second cylinder is pressurized with the hydraulic fluid.

For embodiments, where the moveable carrier plate is connected to the cylinder rod of the second cylinder, the second cylinder chamber of the second cylinder is the lower one. For other embodiments, where the moveable carrier plate is connected to the housing of the second cylinder, the second cylinder chamber of the second cylinder is the upper one.

In some embodiments, the piston and the cylinder rod of the first cylinder are formed in one piece.

This is particularly advantageous for cylinders, where the piston and the cylinder rod shall be manufactured in one step and/or with the same machines. Furthermore, this may increases the stability of the subsystem consisting of piston and cylinder rod of the first cylinder.

In some embodiments, the first cylinder and/or the second cylinder is a synchronous cylinder.

This is particularly advantageous for hydraulic systems, in which the system architecture requires a small pressure tank only. This is because the same amount of hydraulic fluid is used for the first and the second chamber of each cylinder. Due to this, no—or only small—compensating fluid reservoirs for the hydraulic fluid are needed for the cylinders' movements.

In some embodiments, the first cylinder and/or the second cylinder is realized as a plurality of cylinders.

This is particularly advantageous for hydraulic systems, particularly presses, in which the force should be distributed evenly over the moveable carrier plate.

In some embodiments, the clamping apparatus comprises a third cylinder with a piston, a cylinder rod, an outer piston chamber, and an apparatus to pressurize the outer piston chamber with a pressure, where the cylinder rod is suitable, by means of pressurizing the outer piston chamber with a pressure, to clamp and/or unclamp the first cylinder to the pillar.

For systems that are supposed to be steered mainly or only by hydraulic means, the third cylinder is a hydraulic cylinder, which is able to press the cylinder's cylinder rod against the pillar and to release it when required. This can be done by one cylinder or by more cylinders, which are preferably evenly distributed around the pillar. This embodiment is preferred, for instance, when the complete system shall be controllable by hydraulic means.

In some embodiments, the apparatus, which pressurizes the outer piston chamber of the third cylinder with a pressure, comprises a pressure tank and a second 3-port/2-way control valve for controlled pressurizing the outer piston chamber of the third cylinder from the pressure tank.

This is to be considered as one example of implementing the hydraulic control of the third cylinder. Alternatively or additionally, hydraulic force may come from the hydromachine that controls the first and/or the second cylinder.

In some embodiments, a spring is arranged in the third cylinder, which counteracts the pressure of the outer piston chamber. This is one example of an implementation that keeps the construction of the third cylinder easy. Alternatively, the third cylinder may have openings in both chambers of said third cylinder, in order to pressurize them actively with the hydraulic fluid.

In some embodiments, the clamping apparatus comprises an electric motor, preferably a servo motor, which imposes, particularly with a spindle, pressure against the first cylinder, to clamp and/or unclamp the first cylinder to the pillar. This is advantageous for embodiments, where an electric motor is considered to be more easily controllable, or smaller or cheaper than alternative solutions.

In some embodiments, the clamping apparatus comprises a pneumatic actuator, which imposes pressure against the first cylinder, to clamp and/or unclamp the first cylinder to the pillar.

In some embodiments, the pillar has one or more ribs and/or grooves, to clamp reliably the first cylinder to the respective part of said pillar.

The first cylinder can be clamped to the pillar by elements that provide a frictional connection between the clamping apparatus and the pillar, e.g. by a block of rubber or of a rubber-similar component. Alternatively or additionally, a form-locking connection can be established between the clamping apparatus and the pillar. Preferably, this connection is implemented by a recess on the pillar and protrusions on the counterpart that can be moved into said recess by the clamping apparatus. The clamping apparatus, then, provides means to engage with said elements. This has the advantage of providing a detachable connection that can withstand or hold even bigger forces.

In some embodiments, the electro-hydrostatic drive has a pressure source, which maintains, along with the hydromachine, a predefined a positive pressure above atmospheric pressure against the environment.

This increases the dynamic of the system, because pressure can be applied faster to the system's components. The pressure tank can be connected to the hydraulic system by means of valves, e.g. by one or more control valves and/or relief valves. Check valves may be applied as well.

An electro-hydrostatic drive according to the invention uses a method for the implementation of a force-building movement with the steps of clamping, by means of the clamping apparatus, the first cylinder to the pillar; and pressurizing one cylinder chamber of the first cylinder, by means of the first 2-port/2-way control valve, with the hydraulic fluid.

Furthermore, a drive according to the invention may use the additional step of pressurizing, along with one cylinder chamber of the first cylinder a selected cylinder chamber of the second cylinder, which acts into the same direction.

An electro-hydrostatic drive according to the invention uses a method for the implementation of a rapid movement with the steps of unclamping, by means of the clamping apparatus, the first cylinder from the pillar; and pressurizing one cylinder chamber of the second cylinder with the hydraulic fluid.

An electro-hydrostatic drive according to the present invention can be used particularly for hydraulic presses, die cutters, and other machines driven by hydraulically moved plates or the like.

Further objects of the invention will be brought out in the following part of the specification.

The figures show:

FIG. 1: Schematic drawing of a first embodiment of a hydraulic system according to the present invention.

Figure 2:
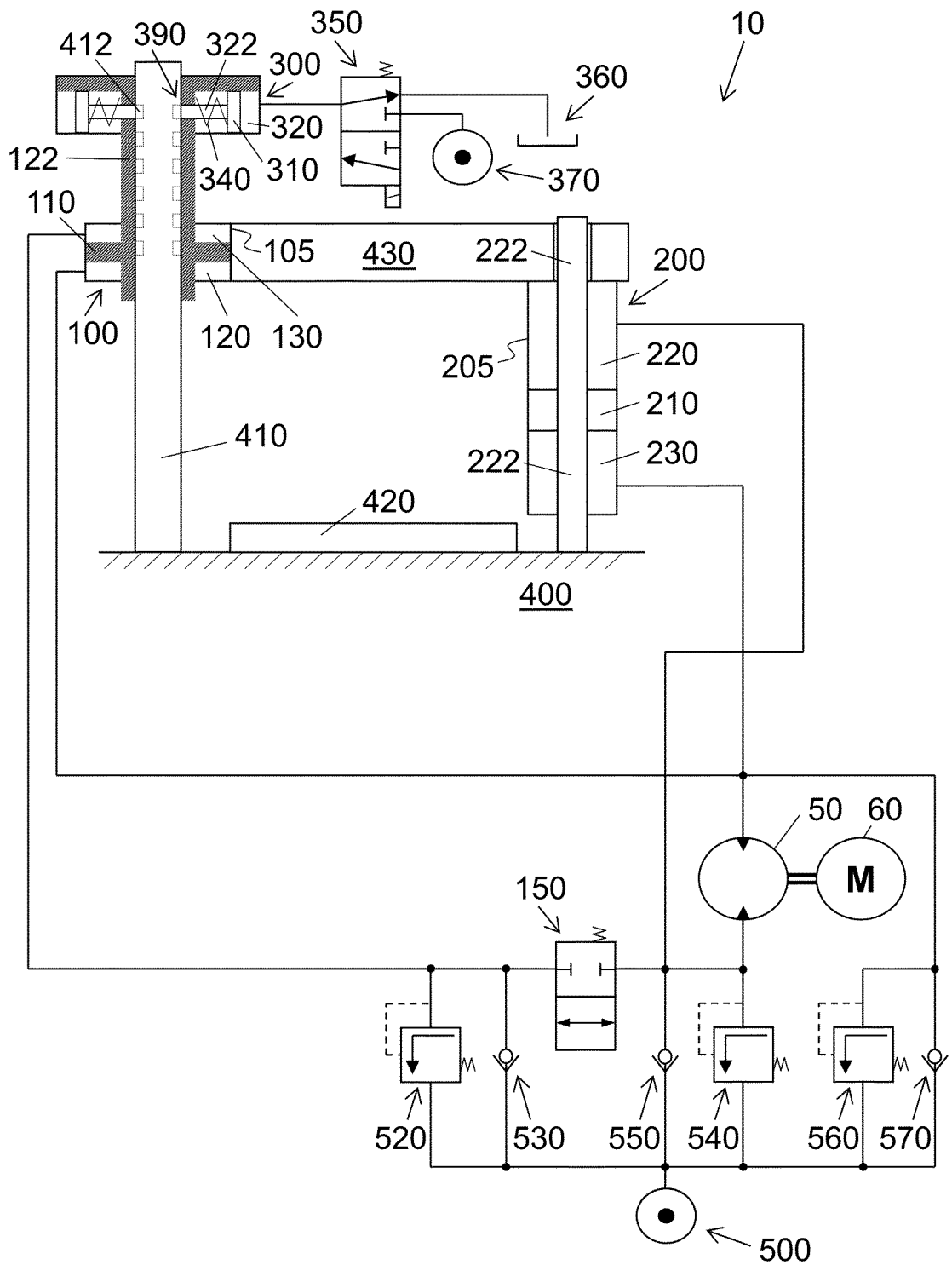

FIG. 2: Schematic drawing of a second embodiment of a hydraulic system according to the present invention.

Figure 3:
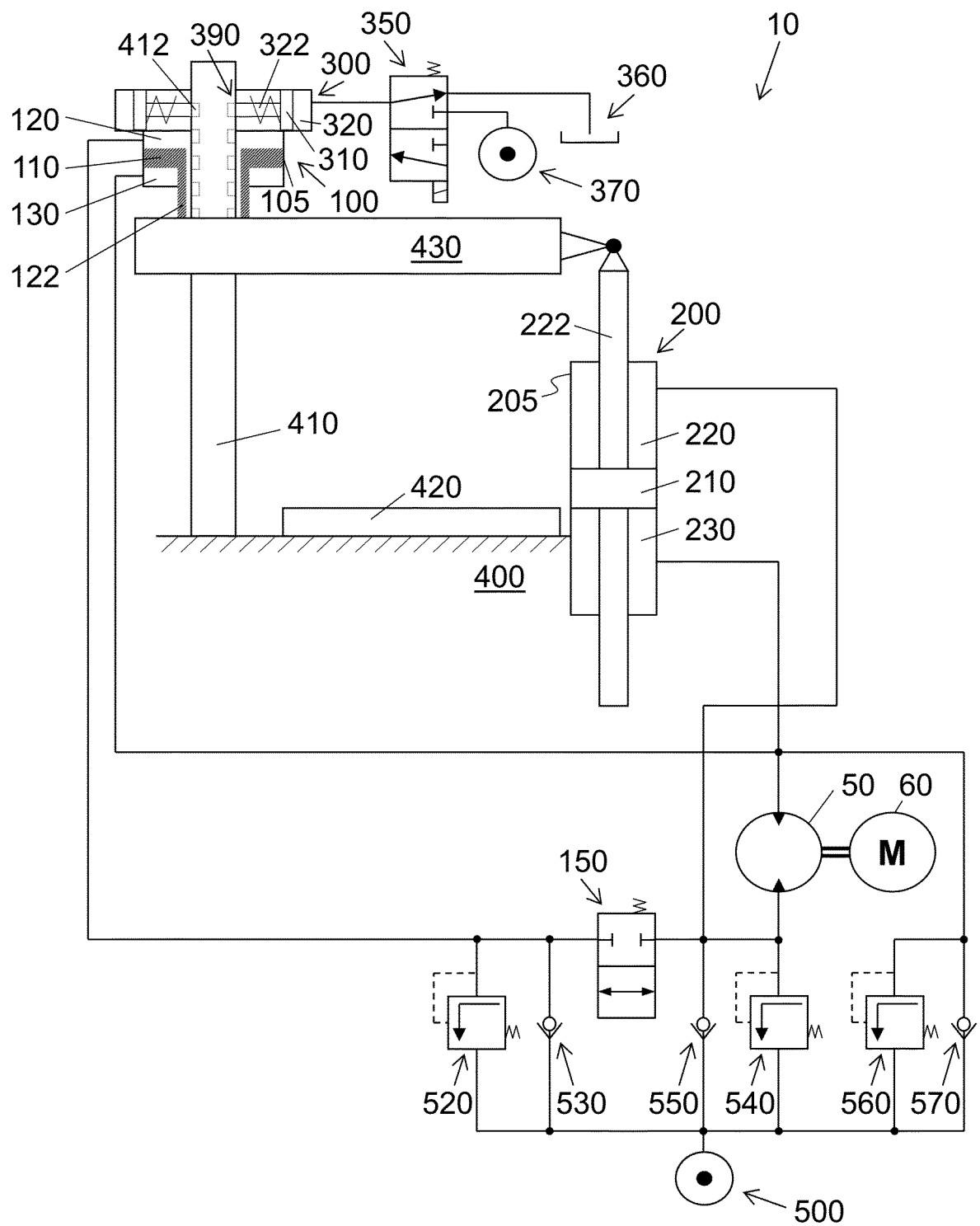

FIG. 3: Schematic drawing of a third embodiment of a hydraulic system according to the present invention.

Figure 4:
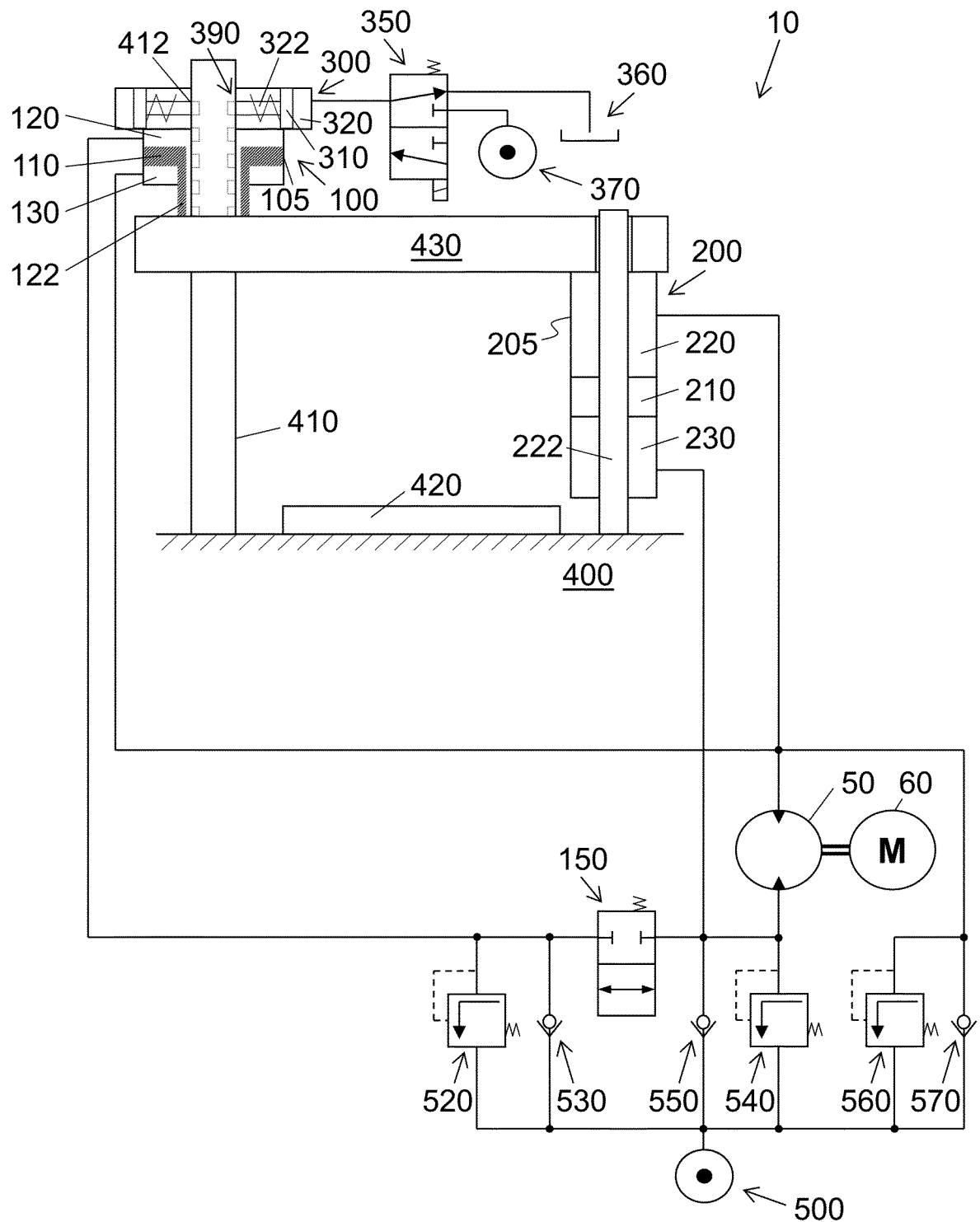

FIG. 4: Schematic drawing of a fourth embodiment of a hydraulic system according to the present invention.

Figure 5:
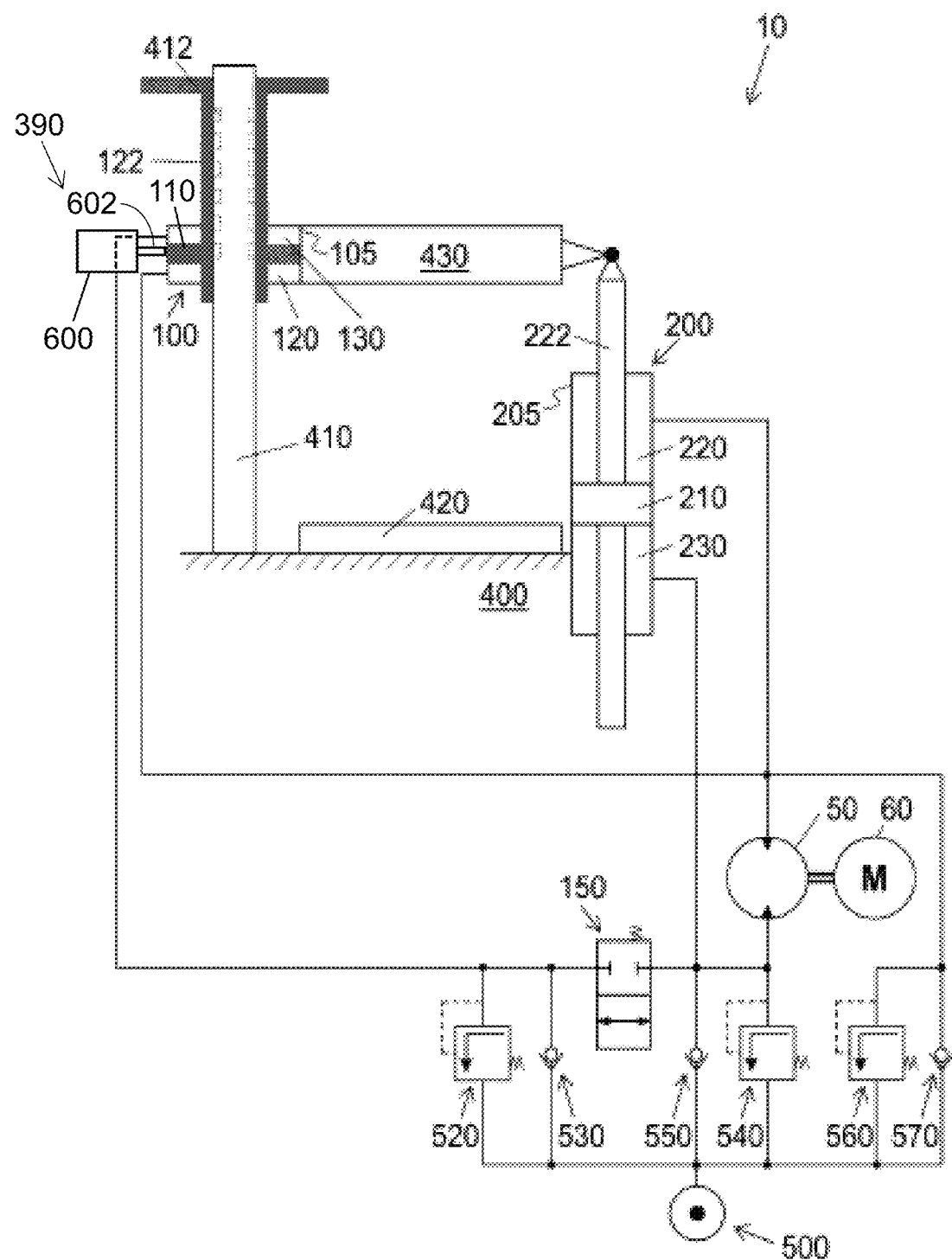

FIG. 5: Schematic drawing of a fifth embodiment of a hydraulic system according to the present invention.

FIG. 1 depicts some essential parts of an exemplary implementation of a hydraulic system according to the present invention. On the left side of the drawing, first cylinder 100 is shown. Cylinder 100 comprises a piston 110 and a first 120 and a second 130 cylinder chamber. Furthermore, first cylinder 100 comprises a housing 105, which is mechanically connected to the moveable carrier plate 430. This plate 430 is also connected to the cylinder rod 222 of the second cylinder 200.

Piston 110, inside the first cylinder 100, is connected to the cylinder rod 122 of the first cylinder 100. This cylinder rod 122 is arranged around pillar 410. By means of a clamping apparatus 390, the cylinder rod 122 can be clamped to and/or unclamped from the pillar 410. Pillar 410, fixed carrier plate 420, and housing 105 of the first cylinder 100 are arranged on floor 400.

When clamped, the force-building movements can be performed. For a force-building movement downward, pump 50 moves the hydraulic fluid "upwards" (using the orientation of this drawing), and valve 150 is opened. Caused by this, the first cylinder chamber 120 of the first cylinder 100 and—possibly optionally, to increase the acting force during the force-building movement—the upper chamber 220 of the second cylinder 200, which acts into the same direction as the first cylinder chamber 120 of the first cylinder 100, are pressurized. This action makes the connected elements first cylinder 100, its housing 105, moveable carrier plate 430, and cylinder rod 222 of the second cylinder 200 shifting downward. For a force-building movement upward, the second cylinder chamber 130 of the first cylinder 100 and the lower chamber 230 of the second cylinder 200 are pressurized. For that, pump 50 moves the hydraulic fluid "downwards" and valve 150 is opened.

When unclamped, cylinder rod 122 is moveable with (very) low friction up and down along pillar 410. Then, the rapid movements can be performed. For a rapid movement downward, pump 50 moves the hydraulic fluid "upwards" and valve 150 is closed, or is kept closed. Hence, only the upper chamber 220 of the second cylinder 200 is pressurized. This shifts cylinder rod 222 downward. Along with this, the connected elements moveable carrier plate 430 and housing 105 of the first cylinder 100 are also shifted downward. For a rapid movement upward, the lower chamber 230 of the second cylinder 200 is pressurized. Note that this rapid movement causes (almost) no movement of the hydraulic fluid in the first cylinder 100, because valve 150 is closed and, therefore, the first cylinder 100 is pressurized.

Due to this—and because, when unclamped, there is only a low friction between cylinder rod 122 and pillar 410—there is no movement between housing 105 and cylinder rod 122. This has the advantage that much energy can be saved, due to the avoidance to move the typically big amount of hydraulic fluid in the first cylinder 100. In addition, the rapid movements become faster.

In addition, the drive 10 comprises a pressure source 500, which maintains, along with the hydro-machine 50, a predefined a positive pressure above atmospheric pressure against the environment.

Further elements, e.g. pressure source 500, relief valve 520, 540, 560, and check valves 530, 550, 570, plus several safety measures are arranged for the correct working of the system.

The clamping apparatus 390 comprises third hydraulic cylinder or clamp cylinder 300, with piston 310 and cylinder rod 322. The cylinder rod 322 is able to engage with—at least one—recess 412 of the pillar 410. Thus, clamping the first cylinder 100 to the pillar 410 is achieved by engaging cylinder rod 322 with recess 412. In the embodiment shown, this is done by pressurizing piston chamber 320 of the third cylinder 300 by connecting it to pressure container 370 by means valve 350. For unclamping the first cylinder 100 from pillar 410, valve 350 is shifted to connected to open tank 360. By this, chamber 320 is depressurized, and spring 340 shifts cylinder rod 322 back. There may be a connection from pressure container 370 to the other parts of the hydraulic system.

Clamping apparatus 390 may, alternatively, comprise a pneumatic actuator, which pressurizes a pneumatic cylinder to impose pressure against the first cylinder 100, to clamp and/or unclamp the first cylinder 100 to the pillar 410. Referring now to FIG. 5, as a further alternative, clamping apparatus 390 may comprise an electric motor 600, preferably a servo motor, which imposes, particularly with a spindle 602, pressure against the first cylinder 100, to clamp and/or unclamp the first cylinder 100 to the pillar 410.

The electro-hydrostatic drive 10 of FIG. 2 is similar to the one of FIG. 1, with the main difference that the second cylinder 200 is connected to the moveable carrier plate 430 via its housing 205, whereas cylinder rod 222 of the second cylinder 200 has no connection to the carrier plate 430, but is connected to the floor. Hence, the fluid passages to the second cylinder 200 need to be twisted, compared to FIG. 1. Accordingly, for movements downward, the lower chamber 230 of the second cylinder 200 is pressurized, and, for movements upward, the upper chamber 220 of the second cylinder 200 is pressurized.

FIG. 3 depicts a further embodiment according to this invention. Here, the first cylinder 100 comprises a piston 110, which is arranged around pillar 410. A clamping apparatus 390 is connected to the housing 105 of the first cylinder 100. The clamping apparatus 390 is realized in a similar way like in the other embodiment, i.e. by a third hydraulic cylinder 300 with a cylinder rod 322 that is able to engage with recess 412 of the pillar 410. When unclamped, piston 110—and thus cylinder 100—is moveable with (very) low friction up and down along pillar 410.

For a force-building movement downward, the clamping apparatus 390 is clamped to the pillar 410, pump 50 moves the hydraulic fluid "downwards" (using the orientation of this drawing), and valve 150 is opened. Caused by this, the first cylinder chamber 120 of the first cylinder 100 and—possibly optionally—the upper chamber 220 of the second cylinder 200, which acts into the same direction as the first cylinder chamber 120 of the first cylinder 100, are pressurized. This moves the moveable carrier plate 430, which is connected to piston 110 downward. Along with these, connected cylinder rod 222 is moved downward. For a force-building movement upward, the second cylinder chamber 130 of the first cylinder 100 and the lower chamber 230 of the second cylinder 200 are pressurized. For that, pump 50 moves the hydraulic fluid "upwards" and valve 150 is opened.

For a rapid movement downward, the clamping apparatus 390 is unclamped from the pillar 410, pump 50 moves the hydraulic fluid "downwards", and valve 150 is closed or kept closed. Hence, only the upper chamber 220 of the second cylinder 200 is pressurized and cylinder rod 222, along with the elements that are connected to it, is shifted downward. Note that also this embodiment of a rapid movement causes (almost) no movement of the hydraulic fluid in the first cylinder 100, because valve 150 is closed and, therefore, the first cylinder 100 is pressurized. For a rapid movement upward, the lower chamber 230 of the second cylinder 200 is pressurized. Also in this embodiment, (almost) no movement of the hydraulic fluid is caused in the first cylinder 100, because there is only a low friction between piston 110 and pillar 410.

The embodiment shown in FIG. 4 is similar to the one of FIG. 3, with the main difference that the second cylinder 200 is connected to the moveable carrier plate 430 via its housing 205, whereas cylinder rod 222 of the second cylinder 200 has no connection to the carrier plate 430, but is connected to the floor. Accordingly, for movements downward, the lower chamber 230 of the second cylinder 200 is pressurized, and, for movements upward, the upper chamber 220 of the second cylinder 200 is pressurized.

LIST OF REFERENCE SIGNS 10 hydraulic drive
50 pump
60 electric motor
100 first cylinder (force-building cylinder)
105 housing of the first cylinder
110 piston, first cylinder
122 cylinder rod, first cylinder
120 first cylinder chamber, first cylinder
130 second cylinder chamber, first cylinder
150 2-port/2-way control valve
200 second cylinder (rapid-movement cylinder)
210 piston, second cylinder
220 first cylinder chamber, second cylinder
222 cylinder rod, second cylinder
230 second cylinder chamber, second cylinder
232 cylinder rod, second cylinder
300 third cylinder (clamp cylinder)
310 piston, third cylinder
312 cylinder rod, third cylinder
320 piston chamber, third cylinder
322 cylinder rod, third cylinder
340 spring
350 3-port/2-way control valve
360 open tank
370 pressure container
390 clamping apparatus
410 pillar
412 recess
420 fixed carrier plate
430 moveable carrier plate
500 pressure source
520 relief valve
530 check valve
540 relief valve
550 check valve
560 relief valve
570 check valve

The invention claimed is:

1. An electro-hydrostatic drive for performing a rapid movement and a force-building movement, comprising:
   a hydro-machine having variable volume and/or rotational speed, wherein the hydro-machine is driven by an electric motor, and wherein the hydro-machine is arranged to provide a volume-flow of a hydraulic fluid,
   a first cylinder including a housing, a piston, a cylinder rod, and a first cylinder chamber and a second cylinder chamber,
   a second cylinder including a piston, a cylinder rod, a first cylinder chamber and a second cylinder chamber,
   a moveable carrier plate connected to the first cylinder and to the second cylinder,
   a pillar, and
   a clamping apparatus arranged to clamp and unclamp the first cylinder to or from the pillar, respectively,
   wherein the electro-hydrostatic drive comprises a closed hydraulic circuit having, when run, a positive pressure above atmospheric pressure,
   wherein the electro-hydrostatic drive, utilizing the hydro-machine, is operable to pressurize either the first cylinder chamber or the second cylinder chamber of the first cylinder and/or the first cylinder chamber or the second cylinder chamber of the second cylinder,
   wherein the clamping apparatus is operable to clamp the first cylinder to the pillar, and wherein the hydro-machine is operable to pressurize the first or second cylinder chamber of the first cylinder with the hydraulic fluid, whereby the force-building movement is performed,
   wherein the clamping apparatus is operable to unclamp the first cylinder from the pillar, and wherein the hydro-machine is operable to pressurize the first or second cylinder chamber of the second cylinder with the hydraulic fluid, whereby the rapid movement is performed,
   wherein the hydro-machine is operable to pressurize the first cylinder chamber of the first and second cylinder with the hydraulic fluid, whereby the first and second cylinder act in the same direction to perform a force-building movement downward, and
   wherein the hydro-machine is operable to pressurize the second cylinder chamber of the first and second cylinder with the hydraulic fluid, whereby the first and second cylinder act in the same direction to perform a force-building movement upward.

2. The electro-hydrostatic drive according to claim 1, wherein the moveable carrier plate is connected to the housing of the first cylinder and to the cylinder rod of the second cylinder.

3. The electro-hydrostatic drive according to claim 1, wherein the moveable carrier plate is connected to the housing of the first cylinder and to the housing of the second cylinder.

4. The electro-hydrostatic drive according to claim 1, wherein the moveable carrier plate is connected to the cylinder rod of the first cylinder and to the cylinder rod of the second cylinder.

5. The electro-hydrostatic drive according to claim 1, wherein the moveable carrier plate is connected to the cylinder rod of the first cylinder and to the housing of the second cylinder.

6. The electro-hydrostatic drive according to claim 1, wherein the hydro-machine is configured:
to move hydraulic fluid in a first direction, whereby a rapid movement downward or the force-building movement downward is performed, and
to move hydraulic fluid in an opposite, second direction, whereby a rapid movement upward or the force-building movement upward is performed.

7. The electro-hydrostatic drive according to claim 1, further including a first 2-port, 2-way valve, which connects the hydro-machine to one of the cylinder chambers of the first cylinder, wherein the electro-hydrostatic drive is further configured to open the first 2-port, 2-way valve for the force-building movement.

8. The electro-hydrostatic drive according to claim 1, wherein the electro-hydrostatic drive is operable to pressurize the first cylinder chamber of the second cylinder with the hydraulic fluid, whereby a rapid movement downward is performed.

9. The electro-hydrostatic drive according to claim 1, wherein the electro-hydrostatic drive is operable to pressurize the second cylinder chamber of the second cylinder with the hydraulic fluid, whereby a rapid movement upward is performed.

10. The electro-hydrostatic drive according to claim 1, wherein the piston and the cylinder rod of the first cylinder are formed in one piece.

11. The electro-hydrostatic drive according to claim 1, wherein the first cylinder and/or the second cylinder is a balanced cylinder.

12. The electro-hydrostatic drive according claim 1, wherein the first cylinder and/or the second cylinder is a plurality of cylinders.

13. The electro-hydrostatic drive according to claim 1, wherein the clamping apparatus includes a third cylinder with a piston, a cylinder rod, an outer piston chamber, and an apparatus operable to pressurize the outer piston chamber with a pressure, where the cylinder rod is suitable, by pressurizing the outer piston chamber with a pressure, to clamp and/or unclamp the first cylinder to the pillar.

14. The electro-hydrostatic drive according to claim 13, wherein the apparatus operable to pressurize the outer piston chamber of the third cylinder with the pressure includes a pressure tank and a 3-port/2-way control valve for controlled pressurizing of the outer piston chamber of the third cylinder from the pressure tank.

15. The electro-hydrostatic drive according to claim 13, wherein a spring is arranged in the third cylinder, which counteracts the pressure of the outer piston chamber.

16. The electro-hydrostatic drive according to claim 1, wherein the clamping apparatus includes a servo-motor arranged to impose, utilizing a spindle, pressure against the first cylinder, to clamp and/or unclamp the first cylinder to the pillar.

17. The electro-hydrostatic drive according to claim 1, wherein the clamping apparatus includes a pneumatic actuator, which imposes pressure against the first cylinder, to clamp and/or unclamp the first cylinder to the pillar.

18. The electro-hydrostatic drive according to claim 1, wherein the pillar is configured to build a form-locking connection between the first cylinder and a corresponding part of the pillar.

19. The electro-hydrostatic drive according to claim 18, wherein the corresponding part of the pillar comprises one or more ribs and/or grooves, whereby the first cylinder is operable to clamp the pillar.

20. The electro-hydrostatic drive according to claim 1, wherein the drive has a pressure source, which maintains, along with the hydro-machine, a predefined positive pressure above atmospheric pressure against the environment.

21. The electro-hydrostatic drive according to claim 1, wherein the second cylinder is a balanced cylinder.

22. A method for implementing a force-building movement and a rapid movement, comprising:
selecting an electro-hydrostatic drive including: (a) a hydro-machine with variable volume and/or rotational speed, driven by an electric motor, for providing a volume-flow of a hydraulic fluid; (b) a first cylinder with a housing, a piston, a cylinder rod, and a first cylinder chamber and a second cylinder chamber; (c) a second cylinder with a piston, a cylinder rod, and a first cylinder chamber and a second cylinder chamber; (d) a moveable carrier plate; (e) a pillar; and (f) a clamping apparatus to clamp or unclamp the first cylinder to or from the pillar, respectively;
wherein the electro-hydrostatic drive has a closed hydraulic circuit, which has, when run, a positive pressure above atmospheric pressure and which, utilizing the hydro-machine, can pressurize either the first cylinder chamber or the second cylinder chamber of the first cylinder and/or the first cylinder chamber or the second cylinder chamber of the second cylinder,
wherein the moveable carrier plate is connected both to the first cylinder and to the second cylinder;
performing the force-building movement by clamping the first cylinder by the clamping apparatus to the pillar and by pressurizing one cylinder chamber of the first cylinder with the hydraulic fluid;
performing the rapid movement by unclamping the first cylinder by the clamping apparatus from the pillar and by pressurizing one cylinder chamber of the second cylinder with the hydraulic fluid;
wherein the force-building movement comprises a force-building movement downward, wherein the pressurizing the one cylinder chamber of the first cylinder comprises pressurizing the first cylinder chamber of the first cylinder with the hydraulic fluid, and the force-building movement downward further comprises pressurizing the first cylinder chamber of the second cylinder, which acts in the same direction, and
wherein the force-building movement comprises a force-building movement upward, wherein the pressurizing the one cylinder chamber of the first cylinder comprises pressurizing the second cylinder chamber of the first cylinder with the hydraulic fluid, and the force-building movement upward further comprises pressurizing the second cylinder chamber of the second cylinder, which acts in the same direction.

23. The method for implementing a force-building movement and a rapid movement according to claim 22, wherein clamping utilizes the clamping apparatus to clamp the first cylinder to the pillar, and wherein pressurizing one cylinder chamber of the first cylinder includes utilizing a first 2-port/2-way control valve with the hydraulic fluid.

* * * * *